United States Patent [19]

Richardson

[11] Patent Number: 4,781,048

[45] Date of Patent: Nov. 1, 1988

[54] METHOD OF FORMING SPIRALLY WOUND GASKETS

[75] Inventor: Leslie Richardson, Ilkley, England

[73] Assignee: Flexitallic Limited, West Yorkshire, England

[21] Appl. No.: 860,171

[22] Filed: May 6, 1986

[30] Foreign Application Priority Data

May 10, 1985 [GB] United Kingdom ................. 8511923

[51] Int. Cl.$^4$ ...................... B21C 47/04; B21C 47/08
[52] U.S. Cl. ......................................... 72/146; 72/148
[58] Field of Search ............ 29/455 LM, 605, 455 R; 72/135, 136, 138, 146, 148, 371; 242/DIG. 3, 66, 67.1 R

[56] References Cited

U.S. PATENT DOCUMENTS

| | | | |
|---|---|---|---|
| 2,312,428 | 3/1943 | Lorig | 72/146 |
| 2,475,856 | 7/1949 | Price | 72/148 |
| 2,579,858 | 12/1951 | Price | 72/148 |
| 2,774,407 | 12/1956 | Jansen | 72/146 |
| 3,905,090 | 9/1975 | Painter | 29/455 R |
| 4,048,829 | 9/1977 | Thomas | 72/148 |
| 4,189,819 | 2/1980 | Nicholson | 29/455 R X |
| 4,583,697 | 4/1986 | Bichot et al. | 242/67.1 R |

*Primary Examiner*—E. Michael Combs
*Attorney, Agent, or Firm*—Nixon & Vanderhye

[57] ABSTRACT

A spiral wound gasket is made by progressively winding strip material between co-operating rollers to form a gasket section, the method of manufacture including the step of separating the rollers at a predetermined rate to give a predetermined rate of growth for the gasket section formed between them.

3 Claims, No Drawings

METHOD OF FORMING SPIRALLY WOUND GASKETS

FIELD OF THE INVENTION

This invention relates to spiral wound gaskets. Such gaskets are well-known; they consist of a narrow metal strip which is profiled widthwise into a shallow V or W (as seen in section) prior to winding to form a plurality of superposed layers, with a narrow strip of a filler material such as a gasket paper interposed between each successive layer. The final product usually has at least two all metal turns at inside and outside to act as strengthening/supporting regions.

Spiral wound gaskets are generally circular although other shapes are also used. They are axially compressible due to the section of the metal strip. The latter and the interposed strip of sealing material co-operate to form an efficient seal when clamped between mating parts such as opposed pipe flanges.

THE PRIOR ART

Hitherto spiral wound gaskets have been made by one of two methods. The commonest method involves winding the strips onto the edge of a driven circular (or other) mandrel, using a co-operating pressure roller which has a deep groove to accommodate the edge of the mandrel. As the spiral is progressively wound, the walls of the groove of the pressure roller provide lateral support, to prevent the spiral from collapsing sideways off the edge of the mandrel. This method is shown in U.S. Pat. No. 2,475,856, for example. It need not be further described.

In another proposed method of winding there is no mandrel as such and the spiral is wound centerless, usually on a horizontal table provided with supporting rollers or wheels. In fact, the deeply grooved pressure roller and a co-operating wheel are still used in this method, but the superposed layers are not wrapped around the rim of the latter; they are supported and/or guided through a circular path by the rollers/wheels just mentioned. This method is shown in GB Pat. No. 1269894. This too requires no further description here.

Common to both methods is the use of pneumatic, or heavy spring biassing means to urge the mandrel/wheel into the groove in the pressure roller (or vice-versa). It is usual to simply rely on this pressure and on the skill of the operative to control the whole operation, from the initial filler-free turns, which are anchored by spot welding, to the build-up of the gasket of desired width, followed by the final filler-free turns which are also spot welded to anchor them and to render the product stable on removal from the machine. However, the control given by pneumatics or springs is not positive, so the skill of individual operatives becomes critical.

As a result of this lack of positive control, and because the filler material is of finite thickness, which may vary from batch to batch and indeed within batches (as may the metal strip to a much lesser extent) there are obvious problems in producing products of uniform diameter.

Accordingly, it is normal to use the inner and outer filler-free turns for "sizing", so that whole turns or part turns can be snipped out to arrive at a target diameter. This is wasteful and costly, but frequently essential if the gasket is to be fitted successfully into an outer guide ring, as is usually the case. Once again, the "sizing" operation relies on operator skill.

A further, related problem arises directly from this fact that the filler is of finite thickness and that it is technically necessary to have some filler-free turns for anchoring/sizing/supporting purposes. At the point of introduction of the filler during winding there is a sudden diameter change where the metal turns are abruptly separated to make room for the filler strip. The opposite effect is noted at the end of the filler winding. The result is a "bump" on the rim of an otherwise circular product. Depending on the diameter and on the thickness of the filler this too can give rise to problems on installation in an outer guide ring, in addition to the sizing problem mentioned earlier.

Yet another problem arises directly from the existing methods of production control. This is that there are very definite limits on the width of the spiral that can be built-up without serious risk of "dishing" or even collapse after/during winding. Narrow strips are particularly difficult in this respect.

All of the above problems have been known for many years; it is an object of the present invention to at least minimize their effect.

BRIEF DESCRIPTION OF THE INVENTION

According to the present invention a method of producing a spiral wound gasket by the progressive winding of strip material to form superposed layers between co-operating rollers includes the step of separating said rollers at a predetermined rate to give a predetermined rate of growth for a gasket section formed between said rollers. The invention further comprises apparatus for carrying out the method, said apparatus comprising a winding station including co-operating roller means between which a spiral wound gasket is built up as a plurality of successive superposed turns of strip material, together with means for separating said rollers at a predetermined rate. In this context, "separating at a predetermined rate" refers to the respective axes of rotation of the rollers and therefore to the gap between them in which the gasket section is wound, or built.

PREFERRED ASPECTS OF THE INVENTION

It will be appreciated that in the method of the invention, there is no pneumatic, hydraulic, spring loaded or other relatively uncontrolled biassing applied to the winding step. Instead, the rollers are progressively and positively separated throughout each winding operation. The rate of such separation is preferably adjustable, so that the rate of growth of the gasket section can be chosen to reflect (amongst other things) the thickness of the filler. By making the rate of separation adjustable within sensibly wide limits it is also possible to accurately control the degree of compaction of the filler, as well as to arrive at a closely controlled outer diameter for the finished product, thereby minimizing the need for any ancillary sizing operations. This also means that the hardness of the gasket can be varied to suit requirements, because the tightness of the wind can be controlled more accurately than was previously possible.

A surprising consequence of using the method/apparatus of the invention is that the "bump" effect previously mentioned is very greatly reduced, even for quite thick filler materials. The reason for this is not clear, but it is thought to result from the controlled, progressive separation, plus of course the lack of any sudden mechanical shocks typical of the rather haphazard pressure control methods previously used. Gaskets wound according to the invention exhibit excellent uniformity of appearance when inspected visually. This apparently carries over into performance, to the extent that when tested against conventionally-wound products intended to meet a particular pressure test specification, products made according to this invention exhibit superior sealing performance, typically double what might be expected.

A further surprising consequence of using the method is that greater section widths can be built up without running into the stability problems which had previously limited the width of the gasket section winding which could be produced (on a commercial production basis) from a given metal strip width and filler. Once again, section widths of the order of twice the previously attainable values can be made. The reason for this is likewise unclear, but it may be due to the high degree of control of the rate of build-up.

It will be appreciated that there are many ways of achieving separation at a predetermined rate. Gear-driven mechanisms may be used. Electronically-controlled motors may be used, particularly where it is also desired to automate other aspects of the winding process, such as the spot welding of initial/final turns and the recording of production rates/sizes.

I claim:

1. A method of producing a spiral wound gasket formed by a plurality of superposed turns of strip material, said method comprising:
   (a) progressively winding a metal strip between a pair of cooperating rollers;
   (b) after winding at least one complete turn of said metal strip, introducing a strip of gasket filler material into the winding ahead of said pair of rollers to form superposed layers of said metal strip and said gasket filler material, wherein a discontinuity is formed in said winding when said gasket material is introduced; and, while continuing to wind said superposed layers of said metal strip and gasket filler material,
   (c) positively separating said rollers at a predetermined rate to give a predetermined substantially constant rate of growth in diameter for a composite gasket section formed between said rollers, said rate being substantially without regard to any local variation in thickness of said layers.

2. A method according to claim 1 including the step of selecting said predetermined rate of positive separation as a function of at least the thickness of the gasket filler strip material.

3. A method according to claim 1 wherein said rate is selected to control the degree of compaction of the filler strip material, to produce composite gasket section of desired hardness.

* * * * *